US005562338A

United States Patent [19]

Yamamoto

[11] Patent Number: 5,562,338

[45] Date of Patent: Oct. 8, 1996

[54] DUAL LENS LAMP ASSEMBLY FOR VEHICULAR USE

[75] Inventor: Hiroshi Yamamoto, Shimizu, Japan

[73] Assignee: Koito Manufacturing Co., Ltd., Tokyo, Japan

[21] Appl. No.: 356,115

[22] Filed: Dec. 15, 1994

[30] Foreign Application Priority Data

Dec. 15, 1993 [JP] Japan ............................ 5-072125 U

[51] Int. Cl.[6] .................................................. B60Q 1/00

[52] U.S. Cl. .......................... 362/61; 362/267; 362/268; 362/310

[58] Field of Search .............................. 362/61, 80, 268, 362/310, 267, 307, 311, 360

[56] References Cited

U.S. PATENT DOCUMENTS

| | | | |
|---|---|---|---|
| 4,670,823 | 6/1987 | Kochi et al. | 362/268 |
| 4,680,678 | 7/1987 | Iwaki | 362/61 |
| 4,849,861 | 7/1989 | Arima | 362/268 X |
| 4,972,302 | 11/1990 | Masuyama et al. | 362/61 |
| 5,117,336 | 5/1992 | Scenzi | 362/61 |
| 5,128,839 | 7/1992 | Kato | 362/61 |
| 5,327,330 | 7/1994 | Van Oel et al. | 362/61 |

*Primary Examiner*—Denise L. Gromada
*Assistant Examiner*—Thomas M. Sember
*Attorney, Agent, or Firm*—Sughrue, Mion, Zinn, Macpeak & Seas

[57] ABSTRACT

A lamp body having a lighting bulb mounted therein has its open front end dually closed by an outer lens of colorless transparent material and an inner lens of colored transparent material. Disposed between the two lenses is a cover of annular shape and opaque material concealing the joint between the lamp body and the outer lens. The cover has several mounting legs on its periphery which are secured to the lamp body. While the outer lens is secured directly to the lamp body, the inner lens is mounted in position by making positive interlocking engagement with the mounting legs of the cover.

9 Claims, 7 Drawing Sheets

DUAL LENS LAMP ASSEMBLY FOR VEHICULAR USE

BACKGROUND OF THE INVENTION

This invention relates generally to electric lamps and more particularly to improvements in a dual lens lamp assembly for use on motor vehicles, among other applications.

Dual lens lamp assemblies have been known and used extensively on motor vehicles. A typical prior art construction (FIG. 1) of such lamp assemblies is such that a lamp body and an outer lens are coupled together to define a lighting chamber for housing an electric lighting bulb.

Disposed just inside the outer lens is an inner lens which is surrounded by a cover of annular shape concealing the sealed joint between the lamp body and the outer lens.

The dual lens lamp assemblies of the foregoing prior art construction had problems with regard to the connection between the annular cover and the inner lens. The connection was such that the inner lens was not supported rigidly enough by the cover, vibrating easily with the travel of the vehicle. Also, because of the same connection, the outerlens had to be inconveniently larger in size than the inner lens, imposing limitations on the design of the lamp assembly and making it difficult to reduce the total size of the lamp assembly.

SUMMARY OF THE INVENTION

The present invention seeks to improve the connection between inner lens and cover in dual lens lamp assemblies of the kind defined, and hence to provide a lamp assembly in which the inner lens and other components are supported without looseness and which can be made smaller in size than heretofore.

Briefly, the invention may be summarized as a dual lens lamp assembly comprising a lamp body having an open end, and an outer lens joined to the lamp body so as to close the open end thereof, the outer lens defining a lighting chamber in combination with the lamp body for housing a light source. Disposed in the lighting chamber so as to conceal a joint between the lamp body and the outer lens, a cover of annular shape has a plurality of mounting legs whereby the cover is mounted fast to the lamp body. An inner lens is positioned between the outer lens and the light source and retained in position by making direct engagement with the mounting legs of the cover.

It should be appreciated that the inner lens is supported by making direct engagement with the mounting legs of the cover which are secured to the lamp body. The inner lens can thus be firmly retained in position against easy vibration with respect to the other parts of the lamp assembly in the face of the bumps and jolts of the motor vehicle. Further, since the cover need not have a part in addition to the mounting legs for engaging the inner lens, the annular space between the outer and inner lenses can be made less than heretofore, contributing materially to reduction in the size of the lamp assembly.

The above and other features and advantages of this invention and the manner of realizing them will become more apparent, and the invention itself will best be understood, from a study of the following description and appended claims, with reference had to the attached drawings showing the prior art and an embodiment of the invention.

DETAILED DESCRIPTION

Prior Art

Figure 1:
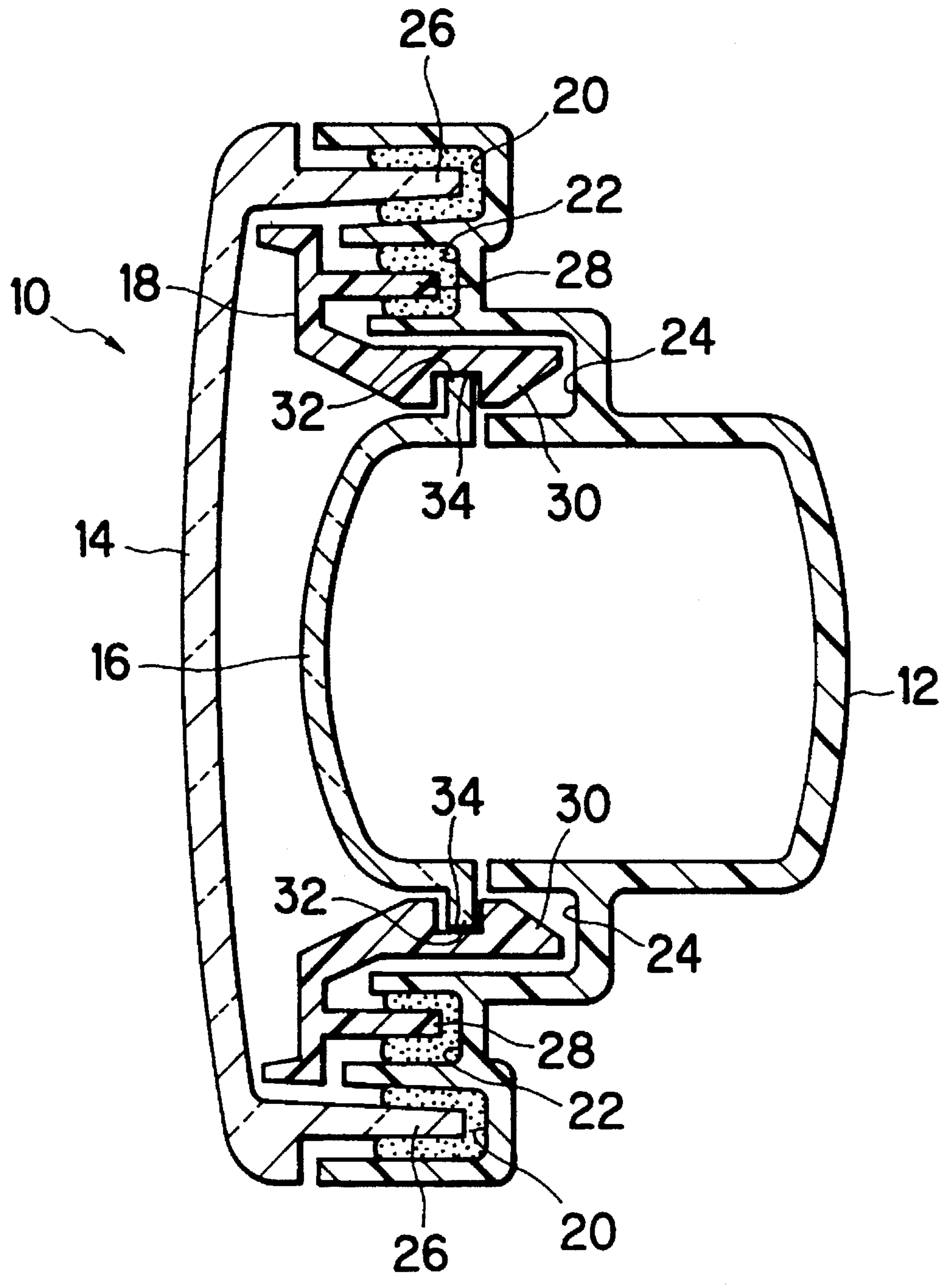
FIG. 1 PRIOR ART
FIG. 1 is a section through the prior art dual lens lamp assembly.
Figure 2:
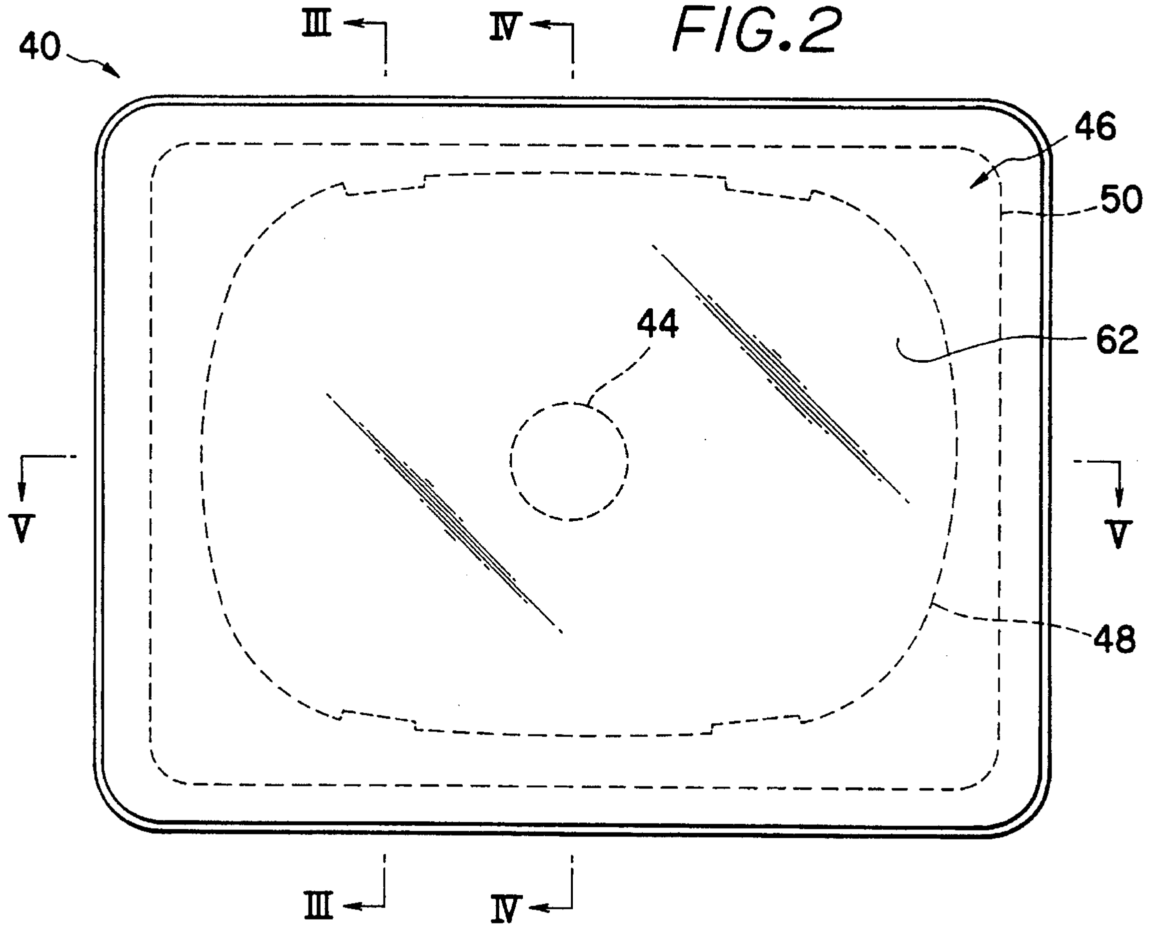
FIG. 2 is an elevation of the improved dual lens lamp assembly according to the invention.

It is considered essential that the prior art dual lens lamp assembly be shown and described in some more detail, the better to make clear the features and advantages of this invention. With reference therefore to FIG. 1, it will be seen that the prior art dual lens lamp assembly 10 has a lamp body 12 housing an electric lighting bulb, not shown, an outer lens 14, an inner lens 16, and a cover 18 of annular shape. The lamp body 12 is formed to provide three grooves 20, 22 and 24 of annular shape and concentric arrangement. The outer lens 14 is secured to the lamp body 12 by having its annular rim 26 engaged fast in the outmost groove 20 in the lamp body. The cover 18 is likewise secured to the lamp body 12 by having its annular rim 28 engaged fast in the intermediate groove 22 in the lamp body.

The cover 18 of the prior art Imp assembly 10 has another annular rim 30 which is loosely engaged in the inmost groove 24 in the lampbody 12. The inner lens 16 is supported between lamp body 12 and outer lens 14 by having its annular rim 32 engaged in a groove 34 in the rim 30 of the cover 18.

The prior art lamp assembly 10 of the foregoing construction is objectionable because, first, the inner lens 16 is supported by the rim 30 of the cover 18. This rim 30 is spaced from the other cover rim 28, which is secured to the lamp body 12, and is itself only loosely received in the lamp body groove 24. The inner lens 16 is therefore easy to vibrate with respect to the lamp body 12 and outer lens 14.

Another objection is that the provision of the two annular rims 28 and 30 on the cover 18 necessitates the creation of an inconveniently large space between the peripheries of the two lenses 14 and 16. This large space has been a bar to the size reduction of this type of lamp assemblies and to the creation of those of various designs.

Embodiment

The foregoing objections are thoroughly overcome by the improved dual lamp assembly of this invention which is shown in its entirety in FIGS. 2–5 and therein generally designated 40. Broadly, the lamp assembly 40 comprises a lamp body 42, an electric lighting bulb 44, an outer lens 46, an inner lens 48, and a cover 50.

Hereinafter in this specification the directional terms such as "forward" and "rearward" will be used with the understanding that the outer lens 46 is forward of the lamp body 42. Thus, for example, the lampbody 42 is open forwardly, and the inner lens 48 is rearward of the outer lens 46. The directional terms such as "inward" and "outward" will be used in reference to the optical axis of the lamp assembly 40. Any part that is closer to the optical axis than is another part can therefore be spoken of as being inward of that other part.

The following is a detailed discussion of the listed lamp body 42, outer lens 46, inner lens 48, and cover 50, in that order and under separate headings.

Lamp Body

Figure 3:
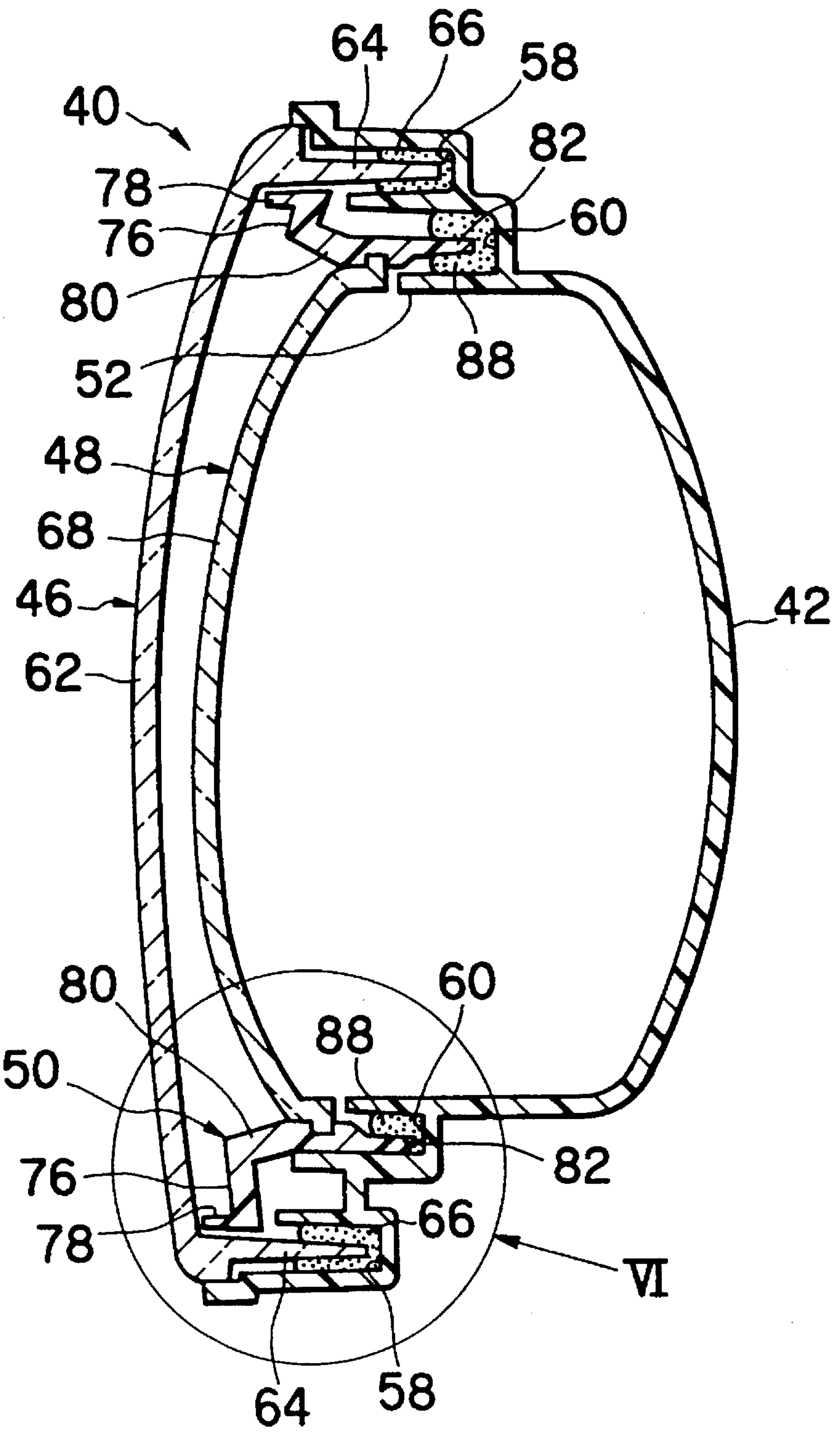
FIG. 3 is a section through the improved dual lens lamp assembly, taken along the line III—III in FIG. 2.
Figure 4:
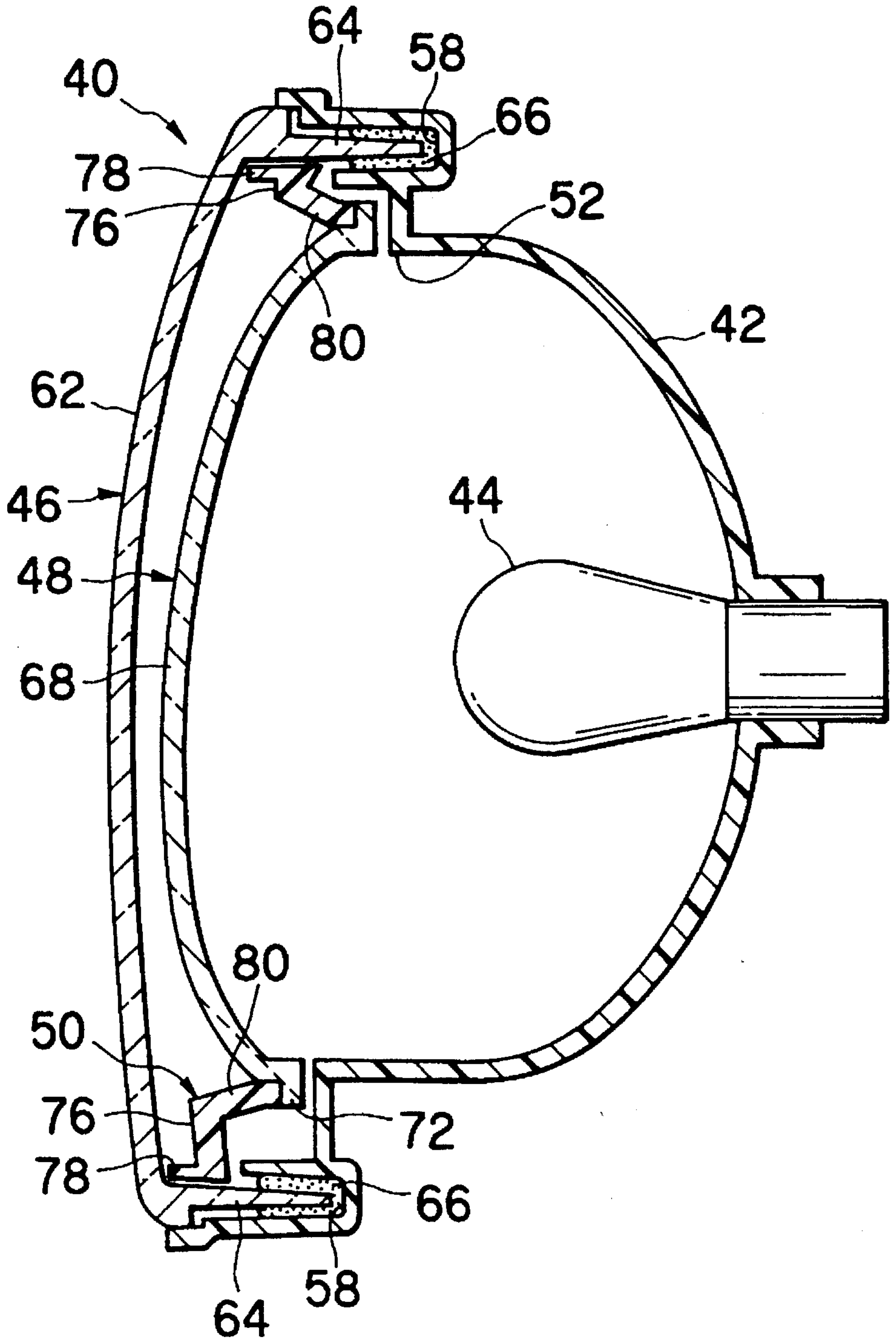
FIG. 4 is another section through the improved dual lens lamp assembly, taken along the line IV—IV in FIG. 2.
Figure 5:
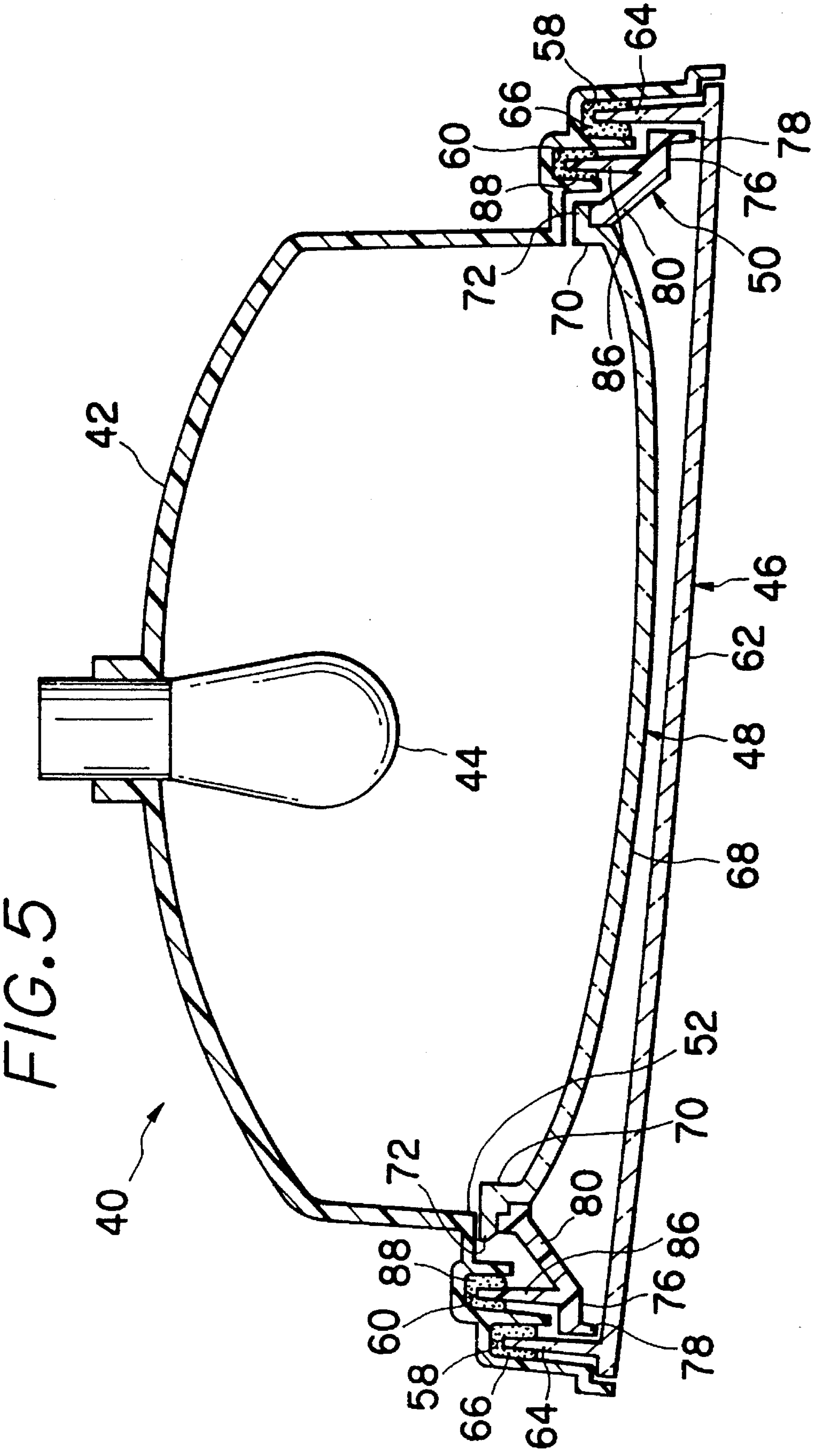
FIG. 5 is still another section through the improved dual lens lamp assembly, taken along the line V—V in FIG. 2.
Figure 6:
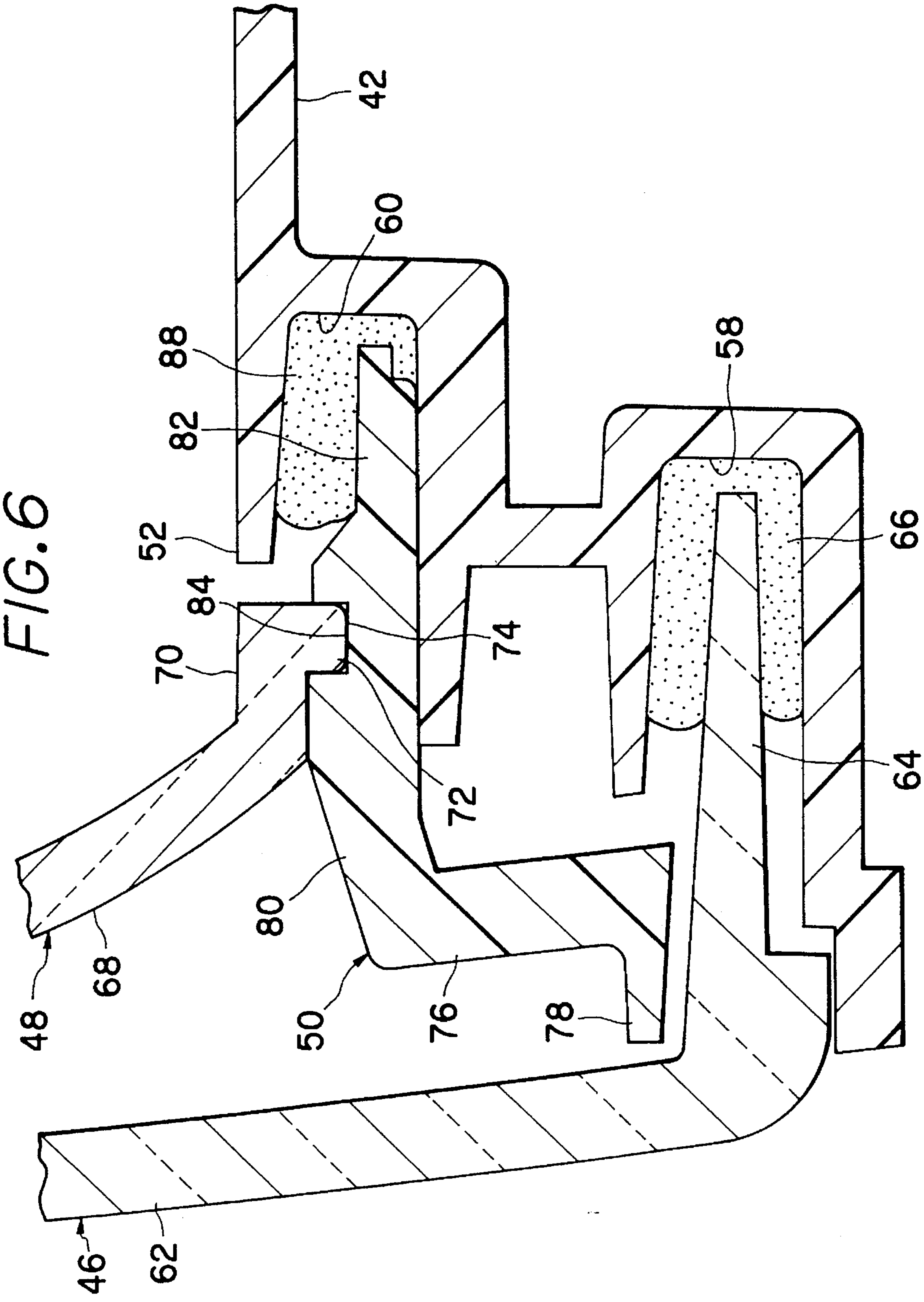
FIG. 6 is an enlarged representation of that part of FIG. 3 which is surrounded by the circle designated VI.

The lamp body 42 appears in FIGS. 3–5 and on an enlarged scale but fragmentarily in FIG. 6. Molded from a plastic, the lamp body 42 has an open front end 52 which is dually covered by the lenses 46 and 48 in a manner yet to be described, thereby providing a closed lighting chamber 54. The electric lighting bulb 44 is disposed in the lighting chamber 54 and mounted centrally to the lamp body 42.

The lamp body 42 is formed to include a groove 58 of annular shape and, inwardly of this groove 58, a plurality of grooves 60 of annular arrangement, both surrounding its front end 52. The outer groove 58 is used for mounting the outer lens 46, and the inner grooves 60 for mounting the cover 50, the inner lens 48 being mounted to this cover.

Outer Lens

The outer lens 46 is fabricated from a colorless, transparent synthetic resin such as acrylics or polycarbonates. As shown in FIGS. 2–6, the outer lens 46 is a one piece molding of a major portion 62 covering the front end 52 of the lamp body 42, and an annular rim 64 projecting rearwardly from the periphery of the major portion 62. The rim 64 is engaged in the outer groove 58 in the lamp body 42 and secured thereto by an adhesive such as a hotmelt 66.

Inner Lens

Figure 7:
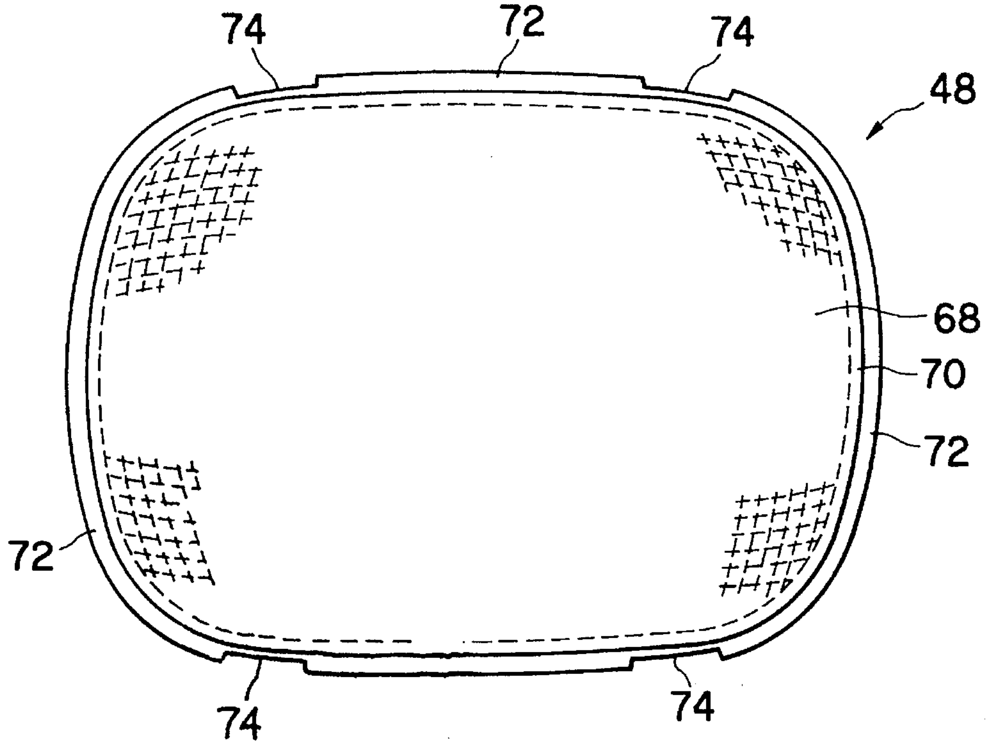
FIG. 7 is an elevation of the inner lens of the improved dual lens lamp assembly.

The inner lens 48 is molded from a colored, transparent synthetic resin. Examples are acrylics or polycarbonates pigmented in, say, red or umber. As illustrated also in FIGS. 3–6 and by itself in FIG. 7, the inner lens 48 has a major portion 68 disposed just behind the major portion 62 of the outer lens 46 and covering the front end 52 of the lamp body 42, an annular rim 70 projecting rearwardly from the periphery of the major portion, and an annular flange 72 turned outwardly from the rear end of the rim. FIG. 7 best indicates that the flange 72 has formed therein a plurality of, four in the illustrated embodiment, recesses 74 opening outwardly.

Cover

Figure 8:
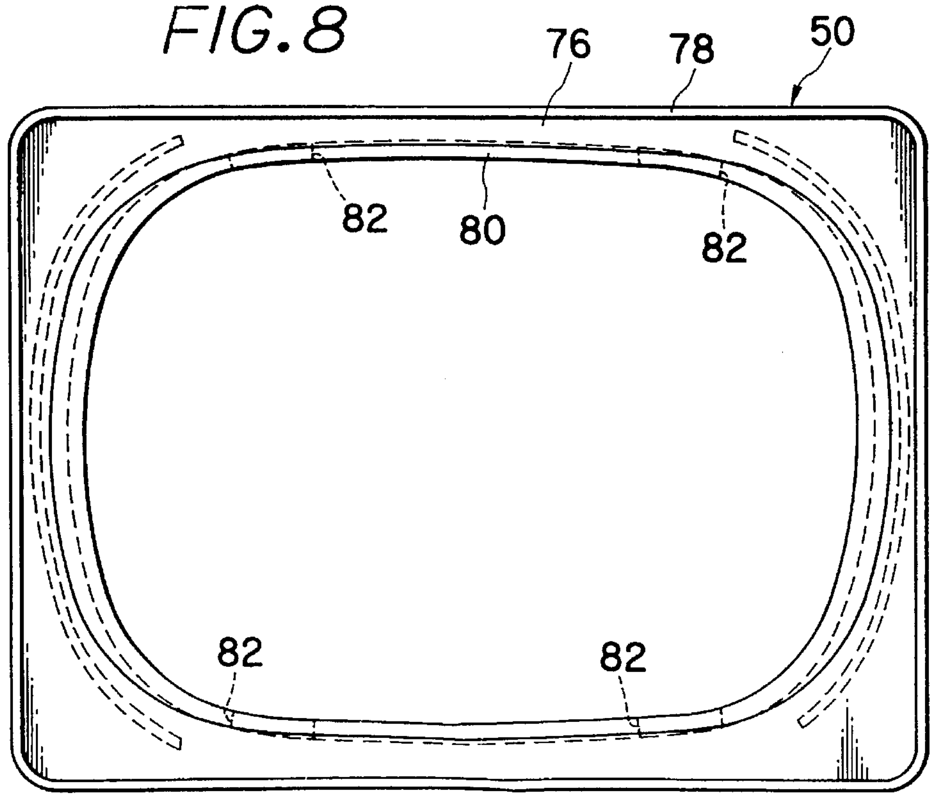
FIG. 8 is an elevation of the cover of the improved dual lens lamp assembly.

The cover 50, a molding of an opaque synthetic resin such as an acrylonitrile-butadiene-styrene copolymer, also appears in all of FIGS. 3–6 but is better illustrated by itself in FIG. 8. Positioned between lamp body 42 and outer lens 46 for concealing the joint therebetween, the cover 50 is generally annular in shape, comprising a web 76, an outer flange 78 turned forwardly from the outer edge of the web, and an inner flange 80 turned rearwardly and somewhat inwardly from the inner edge of the web.

Further, as depicted in FIG. 3 and on an enlarged scale in FIG. 6, the two longer sides of the cover 50 have each a pair of mounting legs 82 extending rearwardly from the inner flange 80 and each having a recess 84 opening inwardly. These mounting legs 82 are engaged respectively in some of the inner grooves 60 in the lamp body 42. FIG. 5 further indicates that the two shorter sides of the cover 50 have additional mounting legs 86 extending rearwardly from the web 76 for engagement in the other inner grooves 60 in the lamp body 42. The cover 50 is secured to the lamp body 42 by filling an adhesive such as a hotmelt 88 in the gaps left in the inner grooves 60 by the mounting legs 82 and 86 of the cover.

As best illustrated also in FIG. 5, the inner lens 48 is supported in position by making interlocking engagement with the mounting legs 82 on the two longer sides of the cover 50. The interlocking engagement is accomplished by engaging the flange 72 of the inner lens 48 in the recesses 84 in the mounting legs 82 of the cover 50 and by engaging these mounting legs in the recesses 74 in the inner lens flange 72. It will be noted from FIGS. 4 and 5 that the rest of the inner lens flange 72 is hold against the rear end of the cover flange 80.

A comparison of FIGS. 3 or 6 with the prior art showing of FIG. 1 will show that the inner lens 48 is supported directly by the rigid mounting legs 82 of the cover 50 according to the invention, instead of by the loose rim 30 of the cover 18 as in the prior art. The inner lens can thus be firmly held against easy vibration during the travel of the vehicle.

It will also be appreciated that the cover 50 of this invention has no part equivalent to the loose rim 30 of the prior art cover 18. This improved construction conduces to the reduction of the annular spacing between the peripheries of the two lenses 46 and 48 and hence of the total size of the lamp assembly.

Notwithstanding the foregoing detailed disclosure, it is not desired that the invention be limited by the exact showing of the drawings or the description thereof. Departures from the illustrated embodiment may be made in order to conform to the design preferences or to the requirements of each specific application within the scope of the invention as expressed in the appended claims.

What is claimed is:

1. A dual lens lamp assembly for use on motor vehicles comprising:

(a) a lamp body having an open end;

(b) an outer lens joined to the lamp body so as to close the open end thereof, the outer lens defining a lighting chamber in combination with the lamp body;

(c) a light source housed in the lighting chamber, (d) a cover of substantially annular shape disposed in the lighting chamber so as to conceal a joint between the lamp body and the outer lens, the cover being formed to include a mounting leg which is directly and fixedly secured to the lamp body, and (e) an inner lens positioned between the outer lens and the light source, said inner lens being secured directly to said mounting leg of the cover.

2. The dual lens lamp assembly of claim 1 wherein the mounting means of the cover comprises a plurality of mounting legs.

3. The dual lens lamp assembly of claim 2 wherein each mounting leg of the cover has a groove cut therein for receiving a periphery of the inner lens.

4. The dual lens lamp assembly of claim 3 wherein the inner lens has a plurality of recesses formed in the periphery thereof for positive interlocking engagement with the grooved mounting legs of the cover.

5. The dual lens assembly of claim 1, further comprising an adhesive for directly adhering said mounting leg to said lamp body.

6. A dual lens lamp assembly for use on motor vehicles comprising:

(a) a lamp body having an open end, a first annular groove surrounding the open end, and a set of second grooves of annular arrangement surrounding the open end;

(b) an outer lens having an annular peripheral rim engaged firmly in the fist groove in the lamp body for closing the open end thereof, the outer lens defining a lighting chamber in combination with the lamp body;

(c) a light source housed in the lighting chamber;

(d) a cover of substantially annular shape disposed in the lighting chamber so as to conceal a joint between the lamp body and the outer lens, the cover having a plurality of mounting legs engaged firmly in the second grooves in the lamp body; and (e) an inner lens positioned between the outer lens and the light source and retained in position by making direct engagement with at least some of the mounting legs of the cover which are engaged firmly in the second grooves.

7. The dual lens lamp assembly of claim 6 wherein the inner lens has an annular rim extending along a periphery thereof, and wherein at least some of the mounting legs of the cover have a groove cut therein for receiving the rim of the inner lens.

8. The dual lens lamp assembly of claim 7 wherein the rim of the inner lens has a plurality of recesses formed therein for positive interlocking engagement with the grooved mounting legs of the cover.

9. The dual lens assembly of claim 6, further comprising an adhesive for directly adhering said mounting legs in said second grooves.

* * * * *